(12) United States Patent
Okano et al.

(10) Patent No.: US 6,311,125 B1
(45) Date of Patent: Oct. 30, 2001

(54) ROAD SELECTING AND EDITING USING SHORTEST PATH TREE

(75) Inventors: Hiroyuki Okano; Takashi Yonezawa, both of Yamato (JP)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/672,259

(22) Filed: Sep. 28, 2000

(30) Foreign Application Priority Data

Sep. 29, 1999 (JP) ................................................. 11-276645

(51) Int. Cl.[7] .................................................... G01C 21/00
(52) U.S. Cl. .......................... 701/208; 701/701; 701/209; 701/210; 340/995
(58) Field of Search ..................................... 701/200, 201, 701/202, 207, 208, 209, 210, 211, 212, 213, 214, 225; 340/995, 998; 342/357, 457; 345/419, 434

(56) References Cited

U.S. PATENT DOCUMENTS

| | | | |
|---|---|---|---|
| 4,891,761 | * 1/1990 | Gray et al. | 701/219 |
| 5,383,128 | * 1/1995 | Nishida et al. | 701/210 |
| 5,982,301 | * 11/1999 | Ohta et al. | 340/995 |
| 6,061,628 | * 5/2000 | Hayashi et al. | 701/208 |

FOREIGN PATENT DOCUMENTS

| | | | |
|---|---|---|---|
| 08202729 | 1/1995 | (JP) | G06F/17/30 |
| 09044791 | 7/1995 | (JP) | G08G/1/0969 |
| 10103996 | 9/1996 | (JP) | G01C/21/00 |

\* cited by examiner

*Primary Examiner*—William A. Cuchlinski, Jr.
*Assistant Examiner*—Marthe Y. Marc-Coleman
(74) *Attorney, Agent, or Firm*—Karl O. Hesse (57) ABSTRACT

Apparatus, program and method for receiving input and specifying a plurality of junctions on a map, specifying an editing object range, and specifying a predetermined block of a road by inputting modifying data items, in order to modify road attribute data items within a predetermined extent. Coordinates of a starting point and a terminal point on a map are input. Additionally, coordinates of relay points can be input. Junctions closest to the starting point and the terminal point are searched, and identified. A search for a route is performed using the junction data items, and road data items of the editing object block are specified. From the junction data items included in the editing object block, the data items of a road connected to the junction within a predetermined extent are specified, and, at the same time, made to be an editing object. Modification data is received, and road attribute data items of the road that is the modifying object are updated based on the modification data.

12 Claims, 8 Drawing Sheets

Example: ◯ Selected Junction

◄━━━► Selected Main Road

✕ All Junctions on Shortest Route

ROAD SELECTING AND EDITING USING SHORTEST PATH TREE

BACKGROUND OF THE INVENTION

1. Field of the Invention

The present invention relates to a road data specification method, a road data editing method, a map data editing apparatus, a map data editing system, a storage medium which stores a software program for specifying road data, and a storage medium which stores a software program for editing road data.

2. Description of Related Art

The Dijkstra method in a car-navigation system and Japanese Patent Laid-Open No. Hei 1(1989)-260628, are examples of art where a shortest route between two points is found, and the search result is displayed in superimposed form on a map display.

Other art is known, in which information of traffic congestion on a road is acquired by a radio communication, or infrared-ray communication, a telephone or the like, and speed information relative to the road is updated.

A traveler often desires to navigate an optimal route from a geographical starting point to a geographical ending or terminal point by making use of road data containing road speed information and classification information indicating whether a road to be navigated is a general road or a superhighway. However, a specific road is always congested, so that a car cannot run at the speed limit of the road, and a point where traffic accidents frequently happen may exist. In this case, a traveling road user may not wish to drive through the point, and may wish to update the road attribute data items (road speed, distance, risk and the like) by specifying a specific block of a road. Also, in some cases, a user may wish to change road attribute data items for a predetermined range adjacent to a predetermined block of a road when the update of the road attribute data items for the specific block of the road is requested.

BRIEF SUMMARY OF THE INVENTION

An advantage of the present invention is that it allows specification of a plurality of junctions on a map to define an editing object range, and specification of a predetermined block of a road for inputting modifying data items, thus modifying road attribute data items within a predetermined extent.

Another advantage of the present invention is that it minimizes a quantity of operations required of an operator in editing road attribute data items on a map.

Still another advantage of the present invention is that it provides a map data editing system, the operation of which is intuitively understood which makes it easier for an operator to edit road attribute data items on a map.

Still further advantage of the present invention is that it minimizes a quantity of resources required in editing road attribute data items on a map.

These and other advantages which will become apparent to a reader of the specification and drawings are obtained by the invention as follows. A plurality of junctions on a map are specified, thus defining an editing object range. By inputting modifying data items, a predetermined block of a road is specified, thus modifying road attribute data items within a predetermined extent.

Coordinates of a starting point and a terminal point of a predetermined block on a map are input. In addition, coordinates of relay points may be input. Road junctions closest to the starting point and the terminal point respectively, are then found in the data base. Searching for a route is executed based on the junction coordinate data items. This search identifies road data items in the block that are available to be modified and they are specified as being available to be modified. Stating this another way, from the junction coordinates data items included in the block to be modified, the road data items connected to each of the junctions within a predetermined extent are specified, and the specified road data items are made to be objects to be modified. Modification data for these specified road data items is then received from any of a number of possible sources, and road attribute data items of a road that is an object to be modified are updated based on the modification data.

In one embodiment, the road data specification method of the present invention specifies a road data item having a junction coordinates data item and a road attribute data item from a map database having a plurality of road data items, and receives modifying range data; and then specifies third and fourth road data items located within an extent specified by the first and second junction coordinates items and the modifying range data.

In the road data specification method of another embodiment of the present invention which specifies a road data item having a junction coordinates data item and a road attribute data item from a map database having a plurality of road data items, the extent specified by the modifying range data is displayed in emphasized form.

A road data editing method of another embodiment of the present invention, edits a road data item having a junction coordinates data item and a road attribute data item from a map database having a plurality of road data items by receiving first, second and third junction coordinates inputs; obtaining first, second and third junction coordinates data items corresponding to the first, second and third coordinates inputs and specifying at least first and second road data items having the first, second and third junction coordinates data items. Then the invention receives modifying range data input and modifying data input regarding the road attribute data item. This input is used to specify third and fourth road data items located within an extent specified by the first, second and third junction coordinates items and the modifying range data; and to update the road attribute data items of the third and fourth road data items based on the modifying data input.

In the road data editing method of another embodiment of the present invention which edits a road data item having a junction coordinates data item and a road attribute data item from a map database having a plurality of road data items, the road data items further comprise road classification data items, and the specification of any of the first and second road data items is executed based on the road classification data items.

A map data editing apparatus of another embodiment of the present invention, comprises an input apparatus and a display apparatus, and specifies predetermined road data items having junction coordinates data items and road attribute data items from a database having a plurality of road data items. It has a coordinates input section for receiving first and second coordinates inputs, a closest junction searching section for finding first and second junction coordinates data items corresponding to the first and second coordinates inputs and an inter-junction shortest route searching section for specifying at least first and second road data items having the first and second junction coordinates data items. It also has a road editing range input section for receiving modifying range data, and a reaching region searching section for specifying at least third and fourth road data items located within an extent specified by the first and second junction coordinates items and the modifying range data.

A map data editing apparatus of another embodiment of the present invention, edits a road data item having a junction coordinates data item and a road attribute data item from a map database having a plurality of road data items by displaying a plurality of road data items located on a predetermined extent and receiving first, second and third coordinates inputs. A closest junction searching section then searches for and obtains first, second and third junction coordinates data items corresponding to the first, second and third coordinates inputs and an inter-junction shortest route searching section specifies at least first and second road data items having the first, second and third junction coordinates data items. The apparatus also has a road editing range input section for receiving modifying range data and a road editing content input section for receiving modifying range data of the road attribute data items. A reaching region searching section is advantageously combined into the embodiment for specifying third and fourth road data items located within an extent specified by the first, second and third junction coordinates items and the modifying range data and a road data processing section updates the road attribute data items of the third and fourth road data items based on the modifying data.

The map data editing apparatus of another embodiment of the present invention, edits a road data item having a junction coordinates data item and a road attribute data item from a map database having a plurality of road data items, in which the road data items further comprise road classification data items, and the map data editing system further comprises a road classification selection section for selecting any of the first and second road data items based on the road classification data items.

DETAILED DESCRIPTION OF THE INVENTION

Figure 1:
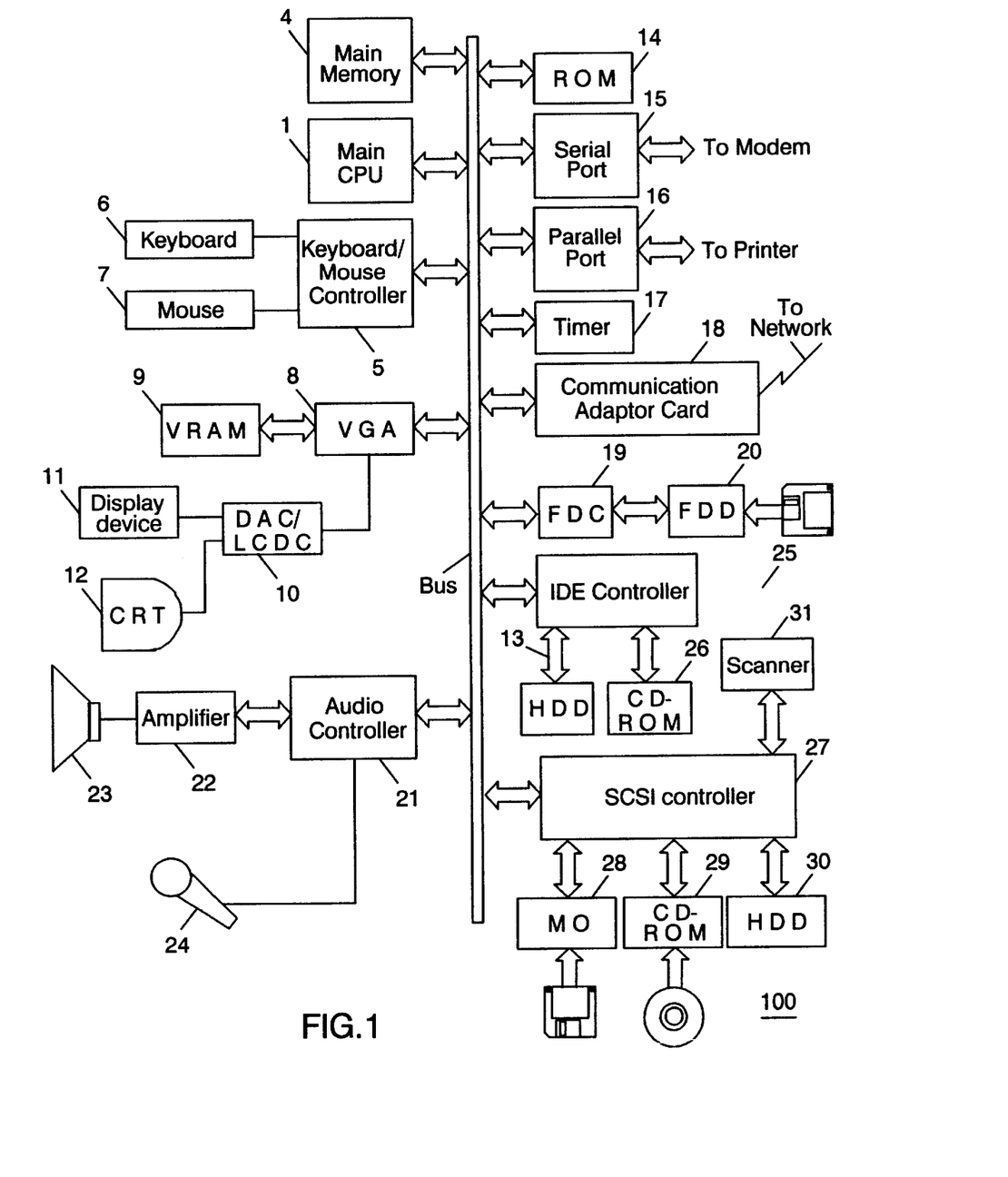
FIG. 1 is a block diagram showing an embodiment of a hardware structure of a map data editing apparatus of the present invention.

FIG. 1 is a schematic view of preferred hardware to be employed in the preferred embodiment of a map data editing system of the present invention. The map data editing system 100 comprises a central processing unit (CPU) 1 and a memory 4. The memory 4 contains the programs which control the other devices of the embodiment according to the invention. The CPU 1 and the memory 4 are connected to hard disk devices 13 and 30 as an auxiliary memory through a bus 2 and the like. A floppy disk device 20 is connected to the bus 2 through a floppy disk controller 19. A medium driving device such as a CD-ROM 26 is connected to the bus 2 through an IDE controller 25. Another medium driving device such as an MO 28 and a CD-ROM 29 are connected to the bus 2 through a SCSI controller 27.

A medium such as a floppy disk is inserted into the floppy disk device 20, and another medium such as an MO is inserted into medium driving device 28. Moreover, still other mediums such as a CD-ROM are inserted into the medium driving devices 26 and 29. Computer readable program codes in the form of a computer program product give instructions to the CPU in cooperation with an operating system to implement the present invention. These codes can be stored in the storage medium such as the floppy disk, the hard disk device 13 and the ROM 14. When the computer program is executed, the computer program is loaded into the memory 4. The codes of this computer program are preferably compressed in order to reduce the amount of space required to store the program and also reduce the length of time necessary to transmit the program over a communication medium in the event that it is loaded into the hardware of FIG. 1 from a communication line. The program code can also be divided into plural pieces and can be recorded in a plurality of mediums.

In the preferred embodiment of the map data editing system 100, the system comprises user interface hardware. User interface hardware, includes, for example, a pointing device 7 such as a mouse, a joystick and a track ball, a key board 6 for supporting a key input, and display devices 11 and 12 for displaying image data to users. Moreover, a speaker 23 receives voice signals from an audio controller 21 through an amplifier 22, and outputs it as a voice.

The map data editing system 100 communicates with other computers and communication satellites through a serial port 15, a modem, and a communication adapter 18 such as a token ring, or the like.

It is contemplated that the present invention can be implemented using ordinary personal computers (PC), workstations, computers incorporated into various kinds of home electronic appliances such as a television set and a facsimile, computers loaded on cars and air planes (car navigation system and the like), or combinations composed of these computers. It should be noted that these constituent components are simply examples and all of the constituent components are not always required for the present invention to operate properly and yield its advantages. Particularly, since the present invention relates to the specification of the map database and the editing thereof, components such as a parallel port 16 and the serial port 15 are not always needed.

A Graphical User Interface operating system of the map data editing system 100, can be realized by Windows NT (trademark of Microsoft Corp.), Windows 9x (trademark of Microsoft Corp.), Windows 3x (trademark of Micro Soft Corp.), OS/2 (trademark of IBM Corp.), Mac OS (trademark of Apple Computer, Inc.), Linux (trademark of Linus Torvlds Corp.) and X-WINDOW system (trademark of MIT Corp.) on AIX (trademark of IBM. Corp.). Alternately a character based environment operating system can be chosen the implement the map data editing system 100. Examples are PC-DOS (trademark of IBM Corp.) and MS-DOS (trademark of Microsoft Corp.). Alternatively, the operating system of the map data editing system 100, can be a real time OS installed into a network computer such as OS/Open (trademark of IBM Corp.) and VxWorks (trademark of Wind River Systems, Inc.), and Java OS. The operating system of the map data editing system 100 is not limited to a particular operating system.

Figure 2:
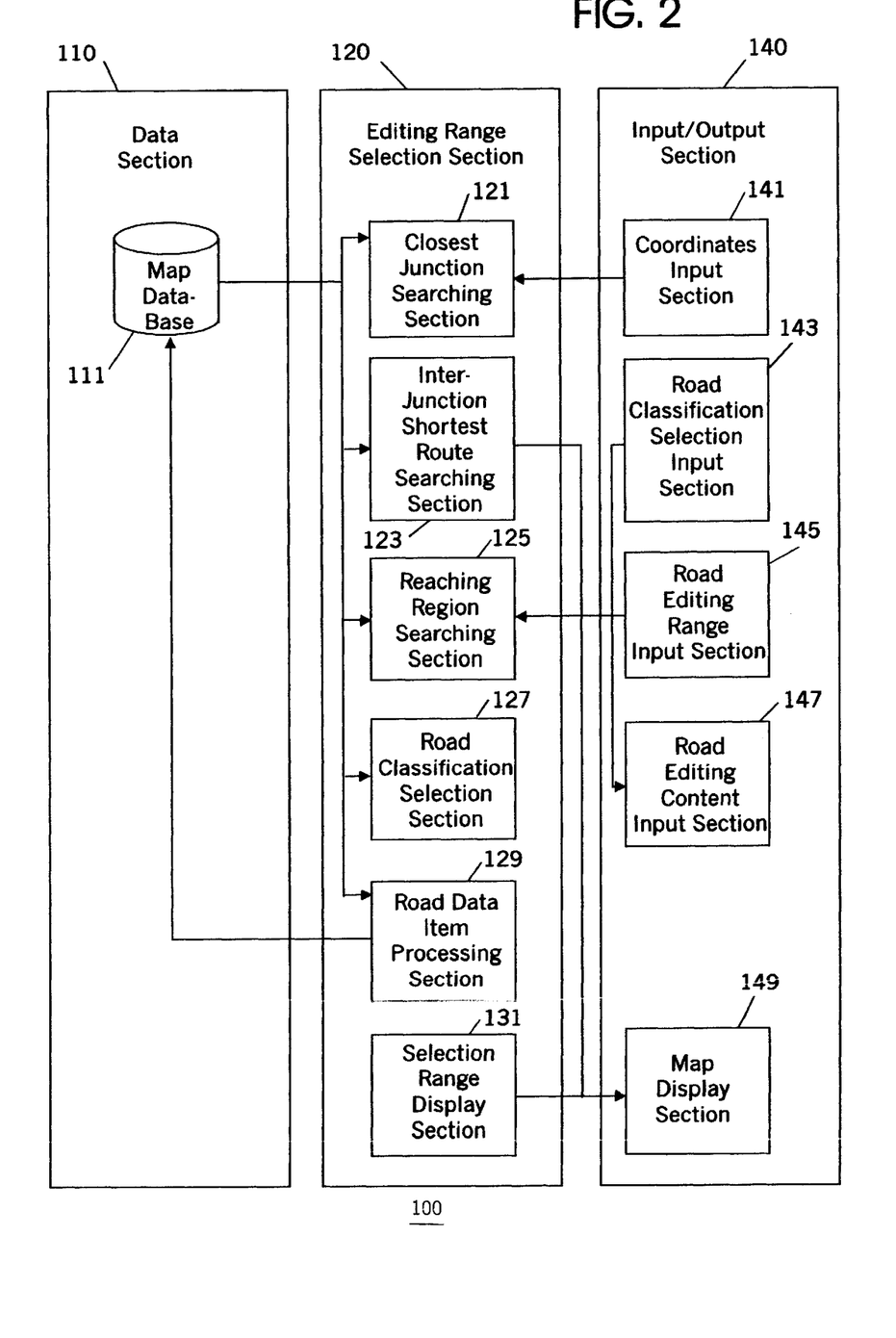
FIG. 2 is a block diagram of processing components of the map data editing system in the embodiment of the present invention.

FIG. 2 is a function block diagram showing processing components of the map data editing system in this preferred embodiment of the present invention. The map data editing system 100 in this embodiment of the present invention comprises a data section 110, an editing range selection section 120 and an input/output section 140.

A map database 111 is stored in the data section 110. The map database 111 in this embodiment of the present invention includes road data items for connecting junctions, and the road data items include information such as coordinates of a junction at a starting point, coordinates of a junction at a terminal point, a distance of a road between junctions, a speed, a sort or type of the road and the like.

The editing range selection section 120 comprises a closest junction searching section 121, an inter-junction shortest route searching section 123, a reaching region searching section 125, a road classification selection section 127, a road data item processing section 129 and a selection range display section 131.

The closest junction searching section 121 searches junctions closest to coordinates specified by an input device or equivalent source of coordinates. To develop a shortest path tree, the shortest routes between the two junctions specified is searched. The reaching region searching section 125 searches a range connected to the junctions within a predetermined extent, which are included in a road block searched by the inter-junction shortest route searching section 123. The road classification selection section 127 specifies road data having predetermined road classification data items. The road data item processing section 129 updates road attribute data items of the road data based on modifying data input. On the display screen, the selection range display section 131 displays the range specified by the reaching region searching section 125.

The input/output section 140 comprises a coordinates input section 141, a road classification selection input section 143, a road editing range input section 145 and a road editing content input section 147. The coordinates input section 141 inputs coordinate values for specifying a starting point, a terminal or ending point and relay or intermediate points of a predetermined block. The coordinates input section 141 is also capable of receiving coordinate data input from a pointing device such as a mouse pointer or a touch panel, and acquiring junction data items of the starting point, the terminal point and the relay points from a communication apparatus connected to a communication satellite or the like, and acquiring a set of all of the junctions included in a predetermined block. In the latter case, the closest junction searching section 121 and the inter-junction shortest route searching section 123 become unnecessary.

The road classification selection input section 143 enables input for selecting the road classification. The road block corresponding to the road classification input is selected as an editing object road block or an editing range road block. The road editing range input section 145 enables input of road editing range data. Road editing range data items include distance (meters) from the editing object block and time (seconds, minutes) which after being set are available in the road editing object block. The road editing content input section 147 enables input of contents of the modifying data of the road attribute data items.

Operation of the Preferred Embodiments of the Invention.

Figure 3:
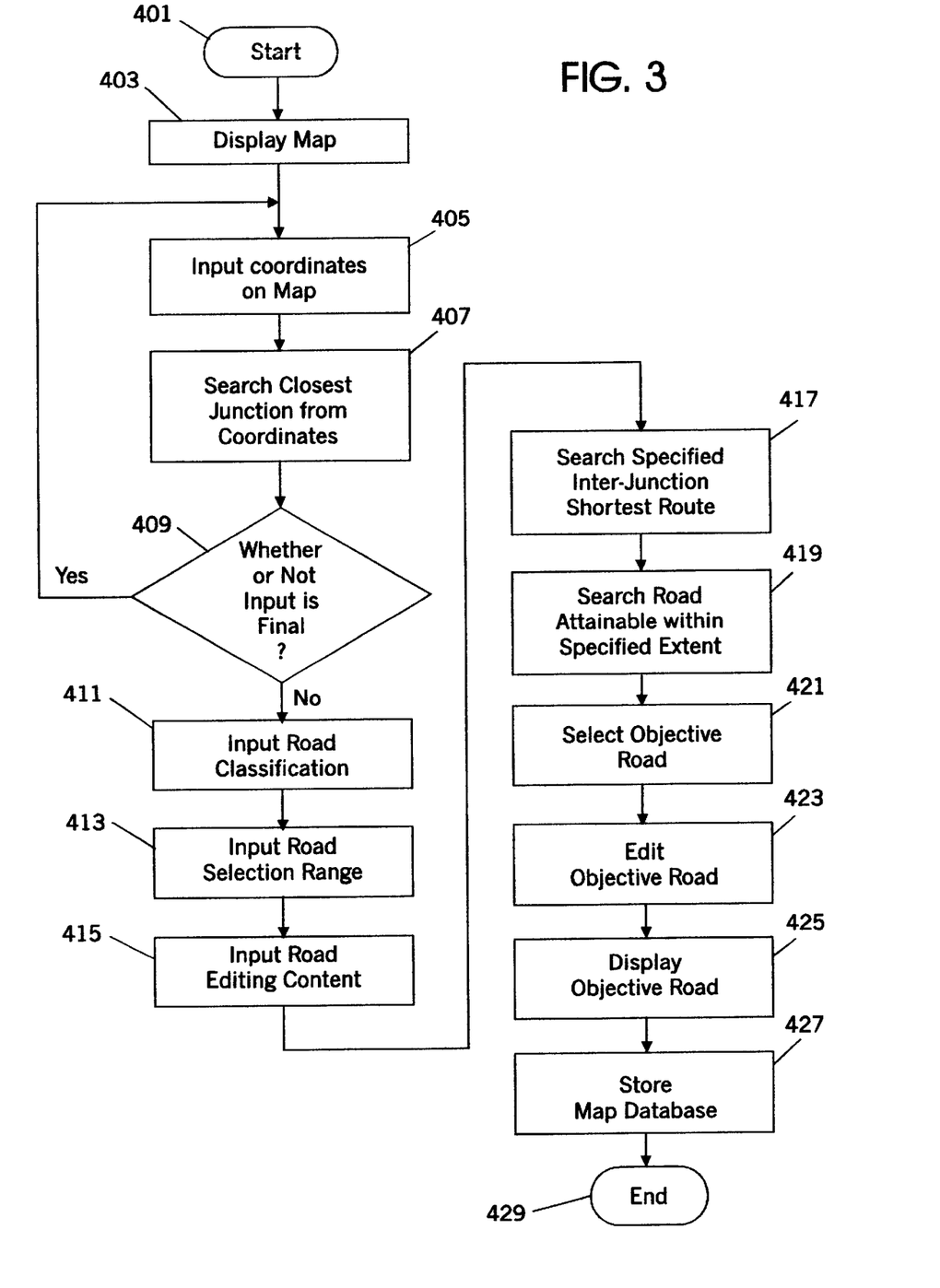
FIG. 3 is a flowchart for explaining processing procedures in the embodiment of the present invention.

Operation of the present invention will be described using the flowchart shown in FIG. 3.

Figure 4:
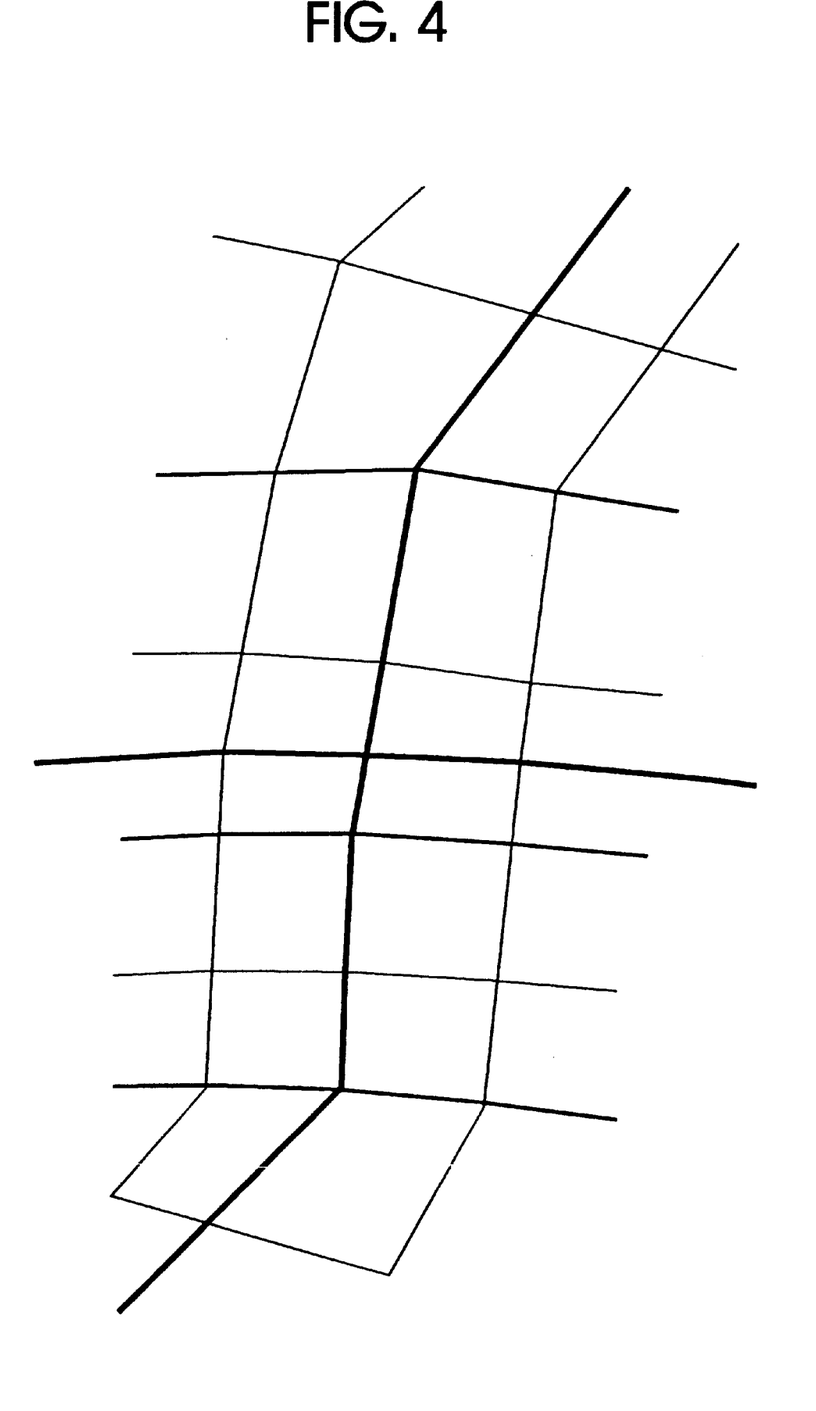
FIG. 4 is a schematic view showing a state in which a map database in the embodiment of the present invention is edited.

First, the map database of road data that exists for a geographical area, also herein called a predetermined extent, is displayed on a display apparatus in step 403. FIG. 4 shows a schematic view of image information generated by a map display section at this step in the process. Then, an input of start coordinates is received in step 405. In this embodiment, the user performs the predetermined coordinates input using a pointing device such as a mouse. These coordinates may not be the exact coordinates of a road intersection or junction.

Figure 5:
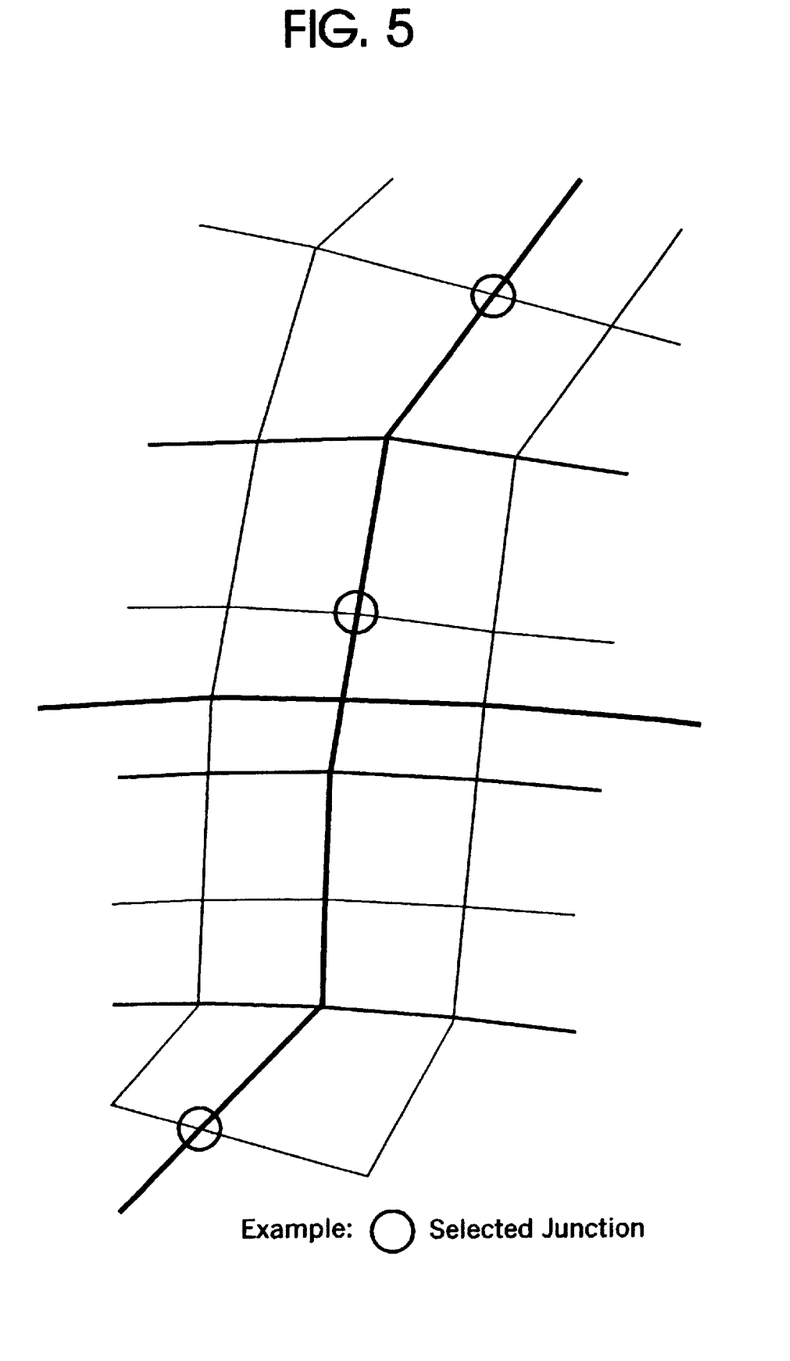
FIG. 5 is a schematic view showing a state in which a map database in the embodiment of the present invention is edited.
Figure 6:
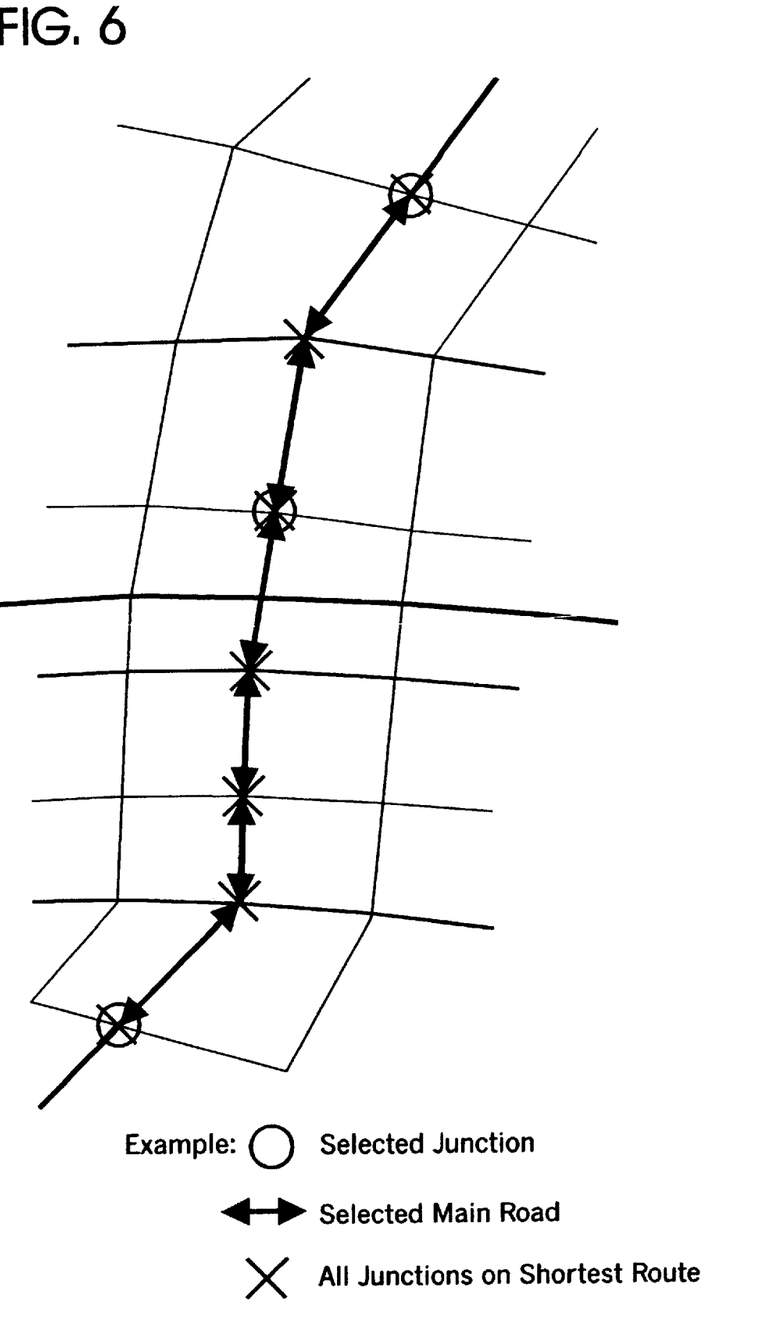
FIG. 6 is a schematic view showing a state in which a map database in the embodiment of the present invention is edited.

In response to the coordinates input, the closest junction searching section 121 of the map data editing system searches for a junction closest to the coordinate values input in step 407. Then, the steps 405 and 407 are repeatedly performed, thus obtaining the junctions of the starting point, the relay points and the terminal point which is identified in step 409. FIG. 5 shows a schematic view of image information generated by the map display section when the junctions of the starting point, the relay points and the terminal point have been obtained. The selected junctions are displayed emphatically so that the selection of the junctions is clearly known to the person providing the input. In the example of FIG. 5, emphasis is provided by a small circle around each selected junction.

When inputs for the junctions of the starting point, the relay points and the terminal point is completed, the operator inputs the road classification, the road selection range and the road editing content in steps 411, 413 and 415. In this embodiment of the present invention, when additional information such as the road attributes exist in the map data section, the road attribute is received from the road classification selection input section, and the received road attribute is later used in searching the for shortest route and selecting the modifying object road. Furthermore, a portion, also called an extent, of the road that is a modifiable object is input from the road selection range input section, and the value input from the road selection range input section is used when a peripheral road around the road communicated from the editing object road block is selected by the process of the invention, and specified within a reaching range indicated by a distance from a main road or by a travel time from the main road. In the next step of the process, editing contents of the road attribute such as a speed for the main road and a speed for the peripheral road that are a modifying object, and a degree of congestion for each of the roads is received as input from the road editing content input section 147.

In the preferred embodiment of the present invention, default of the road classification is expressed as "General Principal Road", default of the road selection range is expressed as "500 m", and default of the road editing content is expressed as "Lowering of Road Speed by 30%". However, in addition to "General Principal Road", the road classifications include "Superhighway", "General Non-Principal Road", "Narrow Road" and the like. By setting the road selection range to 0 m, it is possible to specify only the editing object road block.

Then, after completion of the input of the road classification, the input of the road selection range and the input of the road editing content, the search for the shortest route between the junctions specified in the steps 405 and 407 is performed in step 417 by block 123 of FIG. 2. In this preferred embodiment of the present invention, after completion of the input operations such that the road classification, the road selection range and the road editing content have been received, the search for the shortest route is performed. However, when the junctions are specified in the steps 405 and 407, the search for the shortest route between the junctions is performed at any time, and changing of the display state and recalculating of the shortest route may be performed upon receipt of an input operation such as input of the road classification, input of the road selection range or input of the road editing content.

In this situation, the inter-junction shortest route searching section 123 searches and determines a route among the routes sequentially passing through a plurality of junctions specified using the Dijkstra method. In the shortest route determined by searching, either the distance or the time is shortest. Thus, all junctions through which the shortest route passes are obtained and the shortest route passes through the specified junctions.

In an alternate embodiment, instead of specifying the plurality of junctions on the editing object road block, the process of the invention specifies the extent on the map surrounded by a polygon as a specification editing object. However, a problem arises in the method for surrounding the map by the polygon, when it is wished to specify a general principal road passing under a superhighway as an editing object. The problem is that the superhighway is also specified as part of the editing object. On the other hand, in a method which specifies a road block one by one, connecting the junctions, the operations are more complicated.

When the search for the shortest route is completed, the search for a road attainable within an extent specified in the step 413 is performed at step 417. To be more specific, roads attainable, within the specified extent, from all junctions included in the editing object road block researched in the step 417 are searched by the Dijkstra method. If the object road block searched in the step 417 has been edited so as to set a slow speed only in the object road block searched in the step 417, a bypass detouring the modifying block is a new route in many cases, and hence detouring by other principal roads can not be calculated well. Furthermore, a bypass around the crowded principal road is usually also crowded, so a solution to this problem is to modify adjacent roads simultaneously when editing an object road block.

Figure 7:
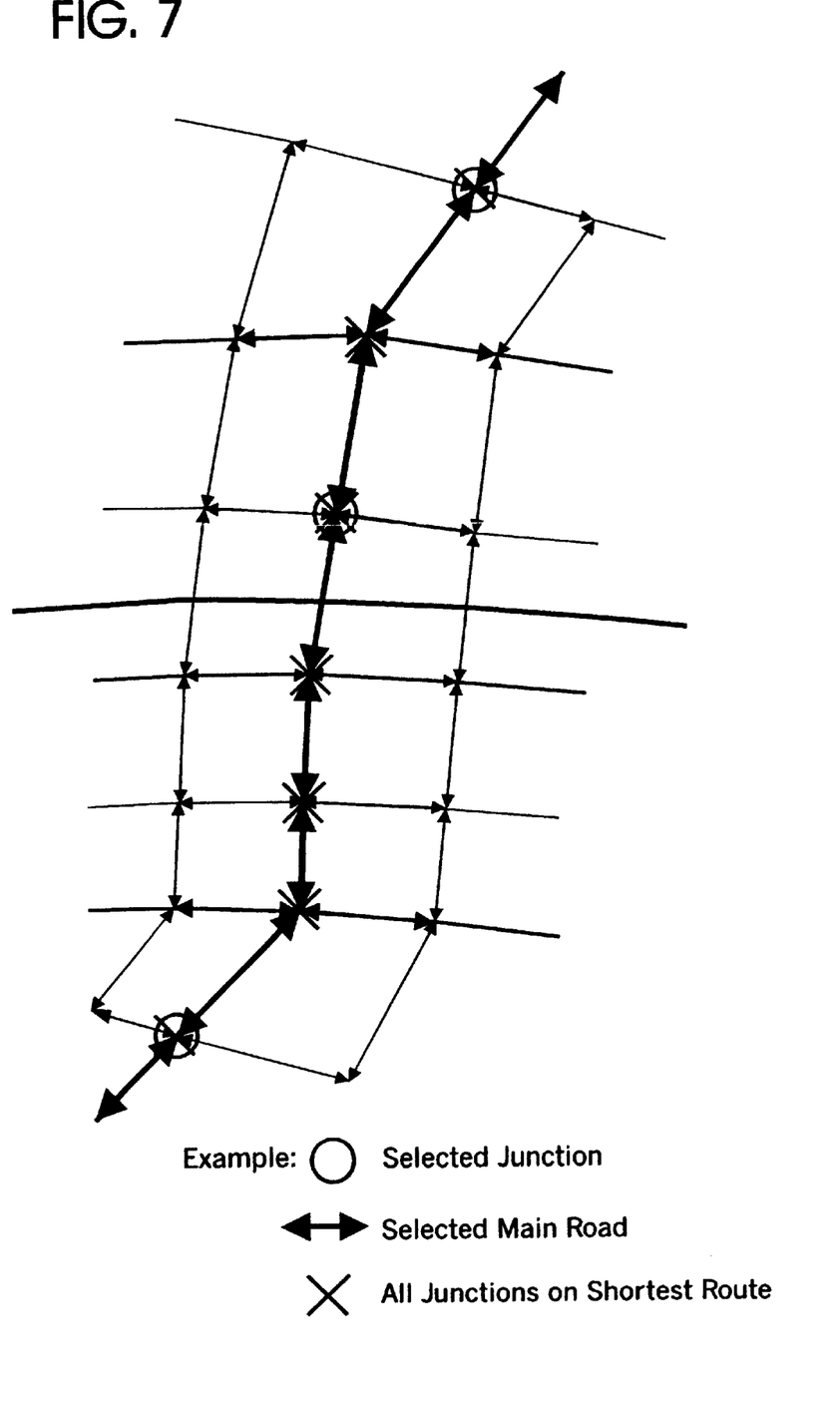
FIG. 7 is a schematic view showing a state in which a map database in the embodiment of the present invention is edited.

This is facilitated at step 421 where an editing object range road is selected as a result of the search in the step 419. FIG. 7 shows a state in which the editing object range road is selected. Road attribute data items of the editing object range road are updated at step 423. The updated data items includes a change of the speed, a closing of the road and the like.

Figure 8:
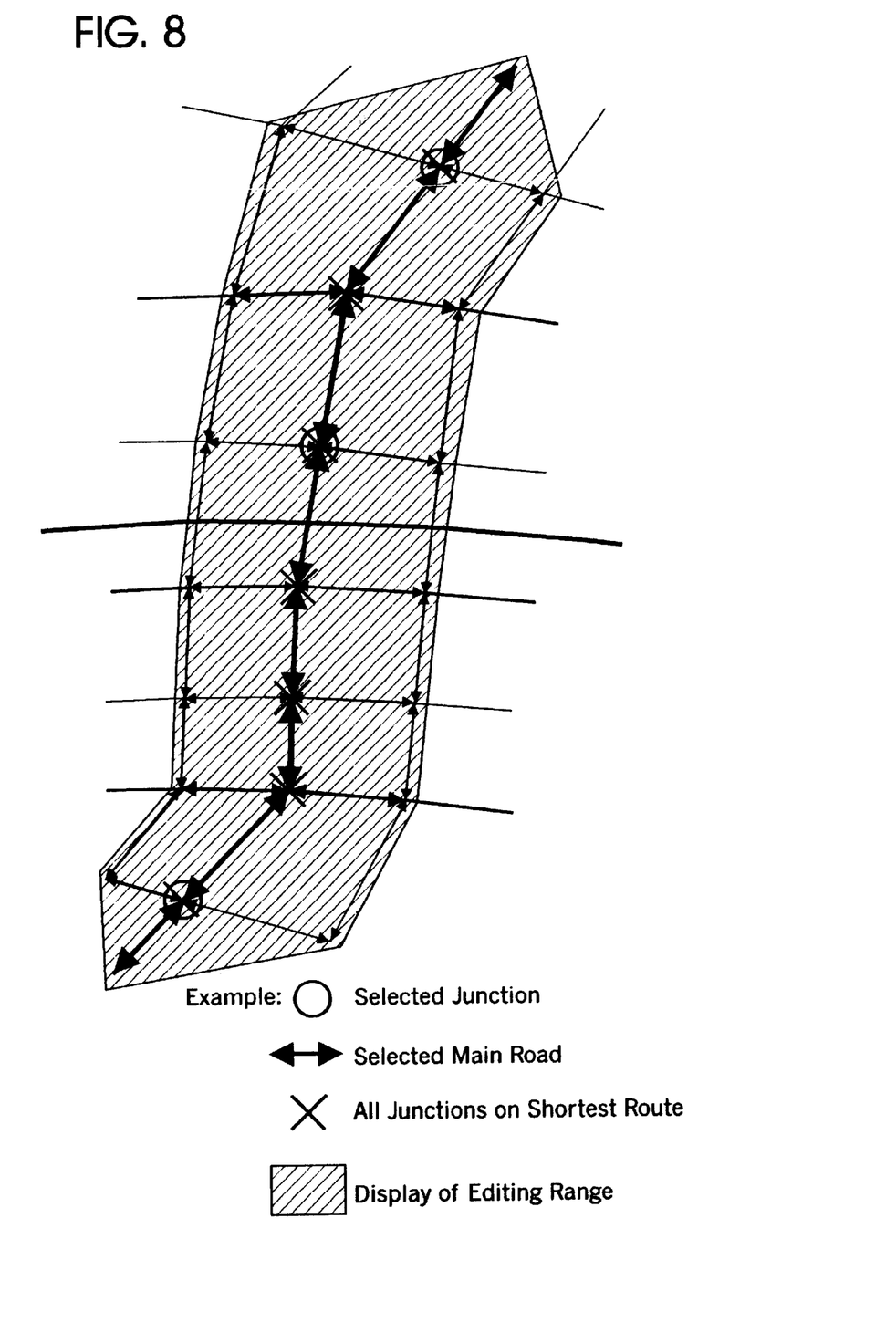
FIG. 8 is a schematic view showing a state in which a map database in the embodiment of the present invention is edited.

Thereafter, the colors of the peripheral roads are changed so as to permit visual identification of: the junctions specified in the steps 405 and 407, the editing object road block determined in the step 417 and the editing range peripheral road selected in the step 421, as shown in FIG. 8. Alternatively, the emphasis mechanism can be a change in the widths of the display lines. Alternatively, the roads of all of the editing objects and the junctions of the roads are surrounded by a polygon including these road and junctions. Alternatively, this polygon is surrounded by a convex polygon making an area of this polygon minimum. Alternatively, the junctions on the boundary between the road that is the editing object and the road that is not the editing object are surrounded by a polygon. The color changes of the peripheral road, the width change and the like in these methods are displayed on the map display section to provide visual emphasis.

As a final step, the edited results are provided as input data items to a known navigation system, and used as guide parameters of a fastest road. The edited road attribute data items are stored at step 427 in the map data section map database after the editing if as desired.

It will be understood by those of skill in the art of map making and navigation that the preferred embodiments described above are not the only possible embodiments of the present invention and that various changes, additions and deletions can be made without departing from the invention which is measured by the following claims.

What is claimed is:

1. A map data editing apparatus which comprises an input apparatus and a display apparatus, and specifies a predetermined road data item having a junction coordinates data item and a road attribute data item from a database having a plurality of road data items, comprising:

(a) said display apparatus for displaying a plurality of road data items located on a predetermined extent;

(b) a coordinates input section for receiving first and second coordinates inputs;

(c) a closest junction searching section for obtaining first and second junction coordinates data items corresponding to said first and second coordinates inputs;

(d) an inter-junction shortest route searching section for specifying at least first and second road data items having said first and second junction coordinates data items;

(e) a road editing range input section for receiving modifying range data; and (f) a reaching region searching section for specifying at least third and fourth road data items located within an extent specified by said first and second junction data items and said modifying range data.

2. The map data editing apparatus according to claim 1, said apparatus further comprising:

a selection range display section for displaying in an emphasized manner, a range specified by said modifying range data.

3. A map data editing system which edits a road data item having a junction ordinates data item and a road attribute data item from a map database having a plurality of road data items, said apparatus comprising:

(a) a map display section for displaying a plurality of road data items located on a predetermined extent;

(b) a coordinates input section for receiving first, second and third coordinates inputs;

(c) a closest junction searching section for obtaining first, second and third junction coordinates data items corresponding to said first, second and third coordinates inputs;

(d) an inter-junction shortest route searching section for specifying at least first and second road data items having said first, second and third junction coordinates data items;

(e) a road editing range input section for receiving modifying range data;

(f) a road editing content input section for receiving modifying data of the road attribute data items;

(g) a reaching region searching section for specifying third and fourth road data items located within an extent specified by said first, second and third junction coordinates data items and said modifying range data; and (h) a road data processing section for updating the road attribute data items of said third and fourth road data items based on said modifying data.

4. The map data editing system according to claim 3, wherein said road data items further comprise road classification data items, and said map data editing system further comprises a road classification selection section which specifies any of said first and second road data items based on said road classification data items.

5. A computer program product comprising: a computer useable medium having computer readable code embodied therein for specifying predetermined road data items having a junction coordinates data item and a road attribute data item from a map database having a plurality of road data items, said computer program product comprising:

(a) computer readable program code devices for displaying a plurality of road data items located on a predetermined extent;

(b) computer readable program code devices for receiving first and second coordinates inputs;

(c) computer readable program code devices for obtaining first and second junction coordinates data items corresponding to said first and second coordinates inputs;

(d) computer readable program code devices for specifying at least first and second road data items which have said first and second junction coordinates data items;

(e) computer readable program code devices for receiving modifying range data; and (f) computer readable program code devices for specifying at least third and fourth road data items located within an extent specified by said first and second junction coordinates items and said modifying range data.

6. The computer program product according to claim 5, further comprising:

computer readable program code devices for displaying in emphasized form, the extent specified by said modifying range data.

7. A computer program product comprising: a computer useable medium having computer readable code embodied therein for editing predetermined road data items having a junction coordinates data item and a road attribute data item from a map database having a plurality of road data items, said computer program product comprising:

(a) computer readable program code devices for displaying a plurality of road data items located on a predetermined extent;

(b) computer readable program code devices for receiving first, second and third coordinates inputs;

(c) computer readable program code devices for obtaining first, second and third junction coordinates data items corresponding to said first, second and third coordinates inputs;

(d) computer readable program code devices for specifying at least first and second road data items which have said first, second and third junction coordinates data items;

(e) computer readable program code devices for receiving modifying range data;

(f) computer readable program code devices for receiving modifying data of the road attribute data items;

(g) computer readable program code devices for specifying third and fourth road data items located within an extent specified by said first, second and third junction coordinates items and said modifying range data; and (h) computer readable program code devices for updating the road attribute data items of said third and fourth road data items based on said modifying data.

8. The computer program product according to claim 7, wherein said road data items further comprise road classification data items, and said computer readable program code devices for specifies said first and second road data items based upon said road classification data items.

9. Method for specifying a predetermined road data item having a junction coordinates data item and a road attribute data item from a map database having a plurality of road data items, said method comprising the steps of:

(a) displaying a plurality of road data items located on a specific extent;

(b) receiving first and second coordinates inputs;

(c) obtaining first and second junction coordinates data items corresponding to said first and second coordinates inputs;

(d) specifying at least first and second road data items having said first and second junction coordinates data items;

(e) receiving modifying range data; and (f) specifying at least third and fourth road data items located within an extent specified by said first and second junction coordinates items and said modifying range data.

10. The method according to claim 9, further comprising the step of displaying in emphasized form, the extent specified by said modifying range data.

11. A road data editing method which edits a predetermined road data item having a junction coordinates data item and a road attribute data item from a map database having a plurality of road data items, said method comprising the steps of:

(a) displaying a plurality of road data items located on a specific extent;

(b) receiving first, second and third junction coordinates inputs;

(c) obtaining first, second and third junction coordinates data items corresponding to said first, second and third coordinates inputs;

(d) specifying at least the first and second road data items having said first, second and third junction coordinates data items;

(e) receiving modifying range data;

(f) receiving modifying data of the road attribute data item;

(g) specifying the third and fourth road data items within an extent specified by said first, second and third junction coordinates data items and said modifying range data; and (h) updating the road attribute data items of said third and fourth road data items based on said modifying data.

12. The method according to claim 11, wherein said road data items further comprise road classification data items, and the step of obtaining any of the first and second road data items is executed based on said road classification data items.

* * * * *